(12) United States Patent
Manno et al.

(10) Patent No.: US 7,575,031 B2
(45) Date of Patent: Aug. 18, 2009

(54) HEAVY DUTY RADIAL TIRE WITH BELT REINFORCING RUBBER LAYER HAVING AXIALLY INNER AND OUTER RUBBER PORTIONS

(75) Inventors: Akira Manno, Kobe (JP); Yukihide Ohya, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 500 days.

(21) Appl. No.: 11/525,992

(22) Filed: Sep. 25, 2006

(65) Prior Publication Data

US 2007/0113946 A1    May 24, 2007

(30) Foreign Application Priority Data

Nov. 22, 2005  (JP)  ............................. 2005-337444
Dec. 28, 2005  (JP)  ............................. 2005-379521

(51) Int. Cl.
*B60C 1/00*     (2006.01)
*B60C 9/18*     (2006.01)
*B60C 9/22*     (2006.01)

(52) U.S. Cl. ...................... 152/531; 152/532; 152/533; 152/534; 152/538

(58) Field of Classification Search ......... 152/531–534, 152/538

See application file for complete search history.

(56) References Cited

U.S. PATENT DOCUMENTS

| | | | |
|---|---|---|---|
| 5,154,217 A | | 10/1992 | Kanamaru |
| 5,738,740 A | * | 4/1998 | Cluzel ..................... 152/531 X |
| 6,082,425 A | * | 7/2000 | Colom .................... 152/532 X |
| 6,367,527 B1 | * | 4/2002 | Cluzel ..................... 152/531 X |
| 6,659,147 B1 | * | 12/2003 | Cordonnier ............. 152/531 X |
| 2006/0169383 A1 | | 8/2006 | Radulescu et al. |

FOREIGN PATENT DOCUMENTS

| | | |
|---|---|---|
| FR | 2 857 620 A1 | 1/2005 |
| JP | 5-69702 A | 3/1993 |
| JP | 2006-193126 A | 7/2006 |

* cited by examiner

*Primary Examiner*—Adrienne C Johnstone
(74) *Attorney, Agent, or Firm*—Birch, Stewart, Kolasch & Birch, LLP

(57) ABSTRACT

A heavy duty radial tire comprises a belt layer having first and third plies of cords arranged at an angle of 10 to 45° relative to the tire equator, and a second ply of cords arranged at an angle of at most 5° relative to the tire equator, the widths W1 and W3 of the first and third plies are at least 85% of a ground contact width Tw and the width W2 of the second ply is at least 70% of the width Tw and is smaller than the widths W1 and W3; and a pair of reinforcing rubber layers disposed between the first and third plies so as to extend axially outwardly from the axially outer ends of the second ply comprising an axially inner portion having E*1 of 8.0 to 14.0 MPa, and an axially outer portion having E*2 of 6.0 to 12.0 MPa smaller than E*1.

10 Claims, 7 Drawing Sheets

HEAVY DUTY RADIAL TIRE WITH BELT REINFORCING RUBBER LAYER HAVING AXIALLY INNER AND OUTER RUBBER PORTIONS

BACKGROUND OF THE INVENTION

The present invention relates to a heavy duty radial tire, more particularly to a heavy duty radial tire with an aspect ratio of 50% or less in which uneven wear and cracking in groove bottom are suppressed by improving the belt layer.

In heavy duty radial tires used for vehicles such as trucks and buses, as shown in FIG. 8, a belt layer "a" which is disposed radially outward of a carcass is generally composed of three or four belt plies "b" of steel belt cords in which disposed on the radially innermost side is a first belt ply b1 of belt cords arranged at an angle of 60±15° with respect to the tire equator, and subsequently disposed radially outward of the first ply are second and third belt plies or second to fourth belt plies of belt cords arranged at an angle of 10 to 35° with respect to the tire equator. The 2nd and 3rd belt plies b2 and b3 are stacked so that the belt cords in the 2nd ply cross the cords in the 3rd belt ply. By such an arrangement is formed a triangle structure that belt cords cross each other between the 1st and 2nd belt plies b1 and b2 and between the 2nd and 3rd belt plies b2 and b3, whereby the belt rigidity is increased to reinforce a tread portion by a hoop effect.

With increase of expressway and development of high performance vehicles, use of low aspect ratio tires as heavy duty tires is increasing since the aspect ratio of the section height of tire to the section width of tire is low and therefore the steering stability is good.

However, in case of low aspect ratio tires, particularly tires having an aspect ratio of 50% or less, a conventional belt layer cannot exhibit a sufficient binding force since the tread portion is wide and the tread profile is flat. Thus, increase or growth of outer diameter (size growth) in a tread portion, particularly in tread shoulder regions, during running becomes large. As a result, the ground contact pressure increases in the tread shoulder regions to induce uneven wear, and separation at belt edges is easy to occur owing to temperature rise. Further, a stress which acts on the bottom of grooves formed in the tread shoulder portions increases to cause damages such as cracking at the groove bottom.

It is an object of the present invention to provide a low aspect ratio heavy duty radial tire in which the binding force of the belt layer is enhanced to suppress the outer diameter growth in a tread portion, particularly the outer diameter growth in tread shoulder regions.

A further object of the present invention is to provide a low aspect ratio heavy duty radial tire having an aspect ratio of at most 50% capable of preventing occurrence of uneven wear, belt edge separation (cord loosening) and cracking at the bottom of tread grooves.

These and other objects of the present invention will become apparent from the description hereinafter.

SUMMARY OF THE INVENTION

In accordance with the present invention, there is provided a heavy duty radial tire comprising a carcass which extends from a tread portion to each of bead cores in a pair of bead portions through a pair of sidewall portions, and a belt layer disposed inside the tread portion and radially outward of the carcass, wherein:

said belt layer comprises at least three plies of belt cords in which disposed on the radially innermost side is a first belt ply of belt cords arranged at an angle of 10 to 45° with respect to the tire circumferential direction, a third belt ply is disposed radially outward of said first belt ply, the belt cords of said third belt ply being arranged at an angle of 10 to 45° with respect to the tire circumferential direction in the slanting direction reverse to that of the first belt ply, and between said first and third belt plies is disposed a second belt ply of belt cords spirally wound at an angle of at most 5° with respect to the tire circumferential direction, and in which the axial width W1 of said first belt ply and the axial width W3 of said third belt ply are at least 85% of a tread ground contact width Tw and the difference W1-W3 is at least 14 mm, and the axial width W2 of said second belt ply is at least 70% of the tread ground contact width Tw and is smaller than the widths W1 and W3 of said first and third belt plies, a pair of reinforcing rubber layers are disposed between said first and third belt plies so as to extend axially outwardly from each of the axially outer ends of said second belt ply, and each of said reinforcing rubber layers comprises an axially inner rubber portion which is contiguous to the axially outer end of said second belt ply and which has a substantially constant thickness T1 of 1.5 to 4.0 mm and a complex elastic modulus E*1 of 8.0 to 14.0 MPa, and an axially outer rubber portion which is contiguous to said axially inner rubber portion and which has a thickness T2e of at least 2.0 mm at the axially outer end of said third belt ply and a complex elastic modulus E*2 of 6.0 to 12.0 MPa which is smaller than the complex elastic modulus E*1.

In accordance with another embodiment of the present invention, there is also provided a heavy duty radial tire comprising a carcass which extends from a tread portion to each of bead cores in a pair of bead portions through a pair of sidewall portions, and a belt layer disposed inside the tread portion and radially outward of the carcass and comprising a plurality of belt plies of belt cords, wherein:

said belt layer comprises a first belt ply disposed on the radially innermost side and having belt cords arranged at an angle of 10 to 45° with respect to the tire circumferential direction, a third belt ply disposed radially outward of said first belt ply and having belt cords arranged at an angle of 10 to 45° with respect to the tire circumferential direction in the slanting direction reverse to that of said first belt ply, a second belt ply disposed between said first and third belt plies and having belt cords spirally wound at an angle of at most 5° with respect to the tire circumferential direction, and a fourth belt ply disposed radially outward of said third belt ply and having belt cords spirally wound at an angle of at most 5° with respect to the tire circumferential direction, in which the axial width W1 of said first belt ply and the axial width W3 of said third belt ply are at least 85% of a tread ground contact width Tw, the axial width W2 of said second belt ply is at least 70% of the tread ground contact width Tw and is smaller than the widths W1 and W3 of said first and third belt plies, the axial width W4 of said fourth belt ply is at least 5 mm, and the distance K from the tire equator to the axially outer end of said fourth belt ply is from 35 to 40% of the tread ground contact width Tw, a pair of reinforcing rubber layers are disposed between said first and third belt plies so as to extend axially outwardly from each of the axially outer ends of said second belt ply, and each of said reinforcing rubber layers comprises an axially inner rubber portion which is contiguous to the axially outer end of said second belt ply and which has a substantially constant thickness T1 of 1.5 to 4.0 mm and a complex elastic modulus E*1 of 8.0 to 14.0 MPa, and an axially outer rubber portion which is contiguous to said axially inner rubber portion and which has a thickness T2e of at least 2.0 mm at the axially outer end of said third belt ply and a complex elastic modulus E*2 of 6.0 to 12.0 MPa which is smaller than the complex elastic modulus E*1.

Preferably, the axially inner rubber portion of the reinforcing rubber layer has a shore A hardness Hs1 of 69 to 79, and the axially outer rubber portion of the reinforcing rubber layer has a shore A hardness Hs2 of 65 to 75 which is smaller than the hardness Hs1.

Preferably, the thickness T2e of the axially outer rubber portion is the same as or larger than the thickness T1 of the axially inner rubber portion.

Preferably, the axially outer rubber portion of the reinforcing rubber layer includes a thickness-gradually increasing part which extends axially outwardly from the axially outer end of the axially inner rubber portion with gradually increasing its thickness T2.

The fourth belt ply may be a pair of belt plies disposed on the both sides with respect to the tire equator with leaving a space between them.

In the present invention, a belt layer is formed by the first and third belt plies having belt cords arranged at an angle of 10 to 45° to cross between the plies, the second belt ply disposed between them and having belt cords spirally wound in substantially the circumferential direction, and optionally the fourth belt ply disposed radially outward of the third belt ply and having belt cords which are preferably oriented in substantially the circumferential direction, and the width of each belt ply is set within a specific range. Thus, an excellent hoop effect can be exhibited over a wide range to prevent the outer diameter growth of the tread portion, whereby occurrence of uneven wear, belt edge separation and cracking at the bottom of tread grooves can be prevented.

Further, in order to prevent occurrence of damages resulting from application of such a belt structure, a pair of reinforcing rubber layers each comprising an axially inner rubber portion having a high modulus of elasticity and an axially outer rubber portion having a slightly higher modulus of elasticity than the inner rubber portion is disposed axially outward of the second belt ply and between the first and third belt plies. The inner rubber portion of the reinforcing rubber layer serves to prevent occurrence of damages such as interlaminar separation between the first and third belt plies, and the outer rubber portion serves to prevent occurrence of cord loosening at the edges of the first and third belt plies. Further, the reinforcing rubber layer serves to ensure an excellent rigidity in a range up to the edges of the belt layer to thereby further enhance the uneven wear resistance, the belt edge separation resistance and the cracking resistance, and it also contributes to improvement in steering stability.

The term "tread ground contact width" as used herein means the maximum axial width of a ground contact area of a tire that contacts a flat surface when the tire is mounted on a standard rim, inflated to a normal inner pressure and loaded with a normal load. The term "standard rim" denotes a rim defined for every tire in a standardizing system on which the tire is based and is, for example, "standard rim" in JATMA, "Design Rim" in TRA and "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO". The term "normal load" denotes a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO.

Further, the term "complex elastic modulus E*" as used herein denote values measured by a viscoelasticity spectrometer under the conditions of measuring temperature 70° C., frequency 10 Hz, initial elongational strain 10% and amplitude of dynamic strain ±2%.

The term "hardness" as used herein means a durometer type A hardness (shore A hardness) measured by a durometer type A according to JIS K-6253.

DETAILED DESCRIPTION OF THE INVENTION

An embodiment of the present invention will now be explained with reference to the accompanying drawings.

Figure 1:
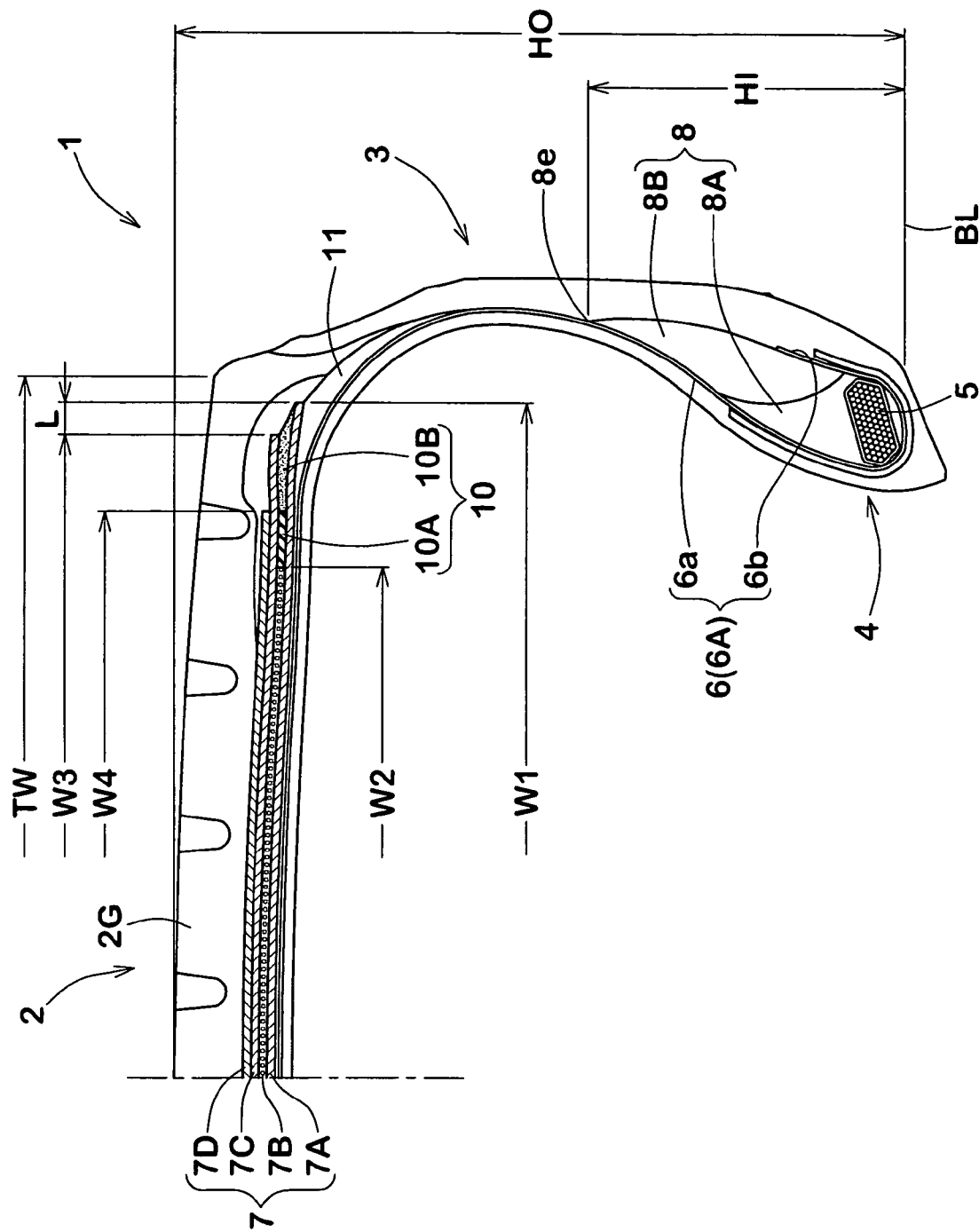
FIG. 1 is a cross sectional view of a heavy duty radial tire showing an embodiment of the present invention.

As shown in FIG. 1, heavy duty radial tire 1 according to the present invention includes, at least, a toroidal carcass 6 that extends from a tread portion 2 to each of bead cores 5 in opposing bead portions 4 through sidewall portions 3, and a belt layer 7 that is disposed inside the tread portion 2 and radially outward of the carcass 6. In this embodiment is shown a low aspect ratio tire having an aspect ratio of 50% or less. The aspect ratio denotes a ratio of the section height of tire to the section width of tire (tire section height/tire section width).

The carcass 6 comprises at least one carcass ply 6A (in this embodiment, one carcass ply) in which carcass cords are disposed at an angle of 75 to 90° with respect to the tire circumferential direction. The carcass ply 6A is composed of a toroidal main portion 6a that extends from one bead core 5 to the opposing bead core 5, passing through the crown region of the tire, and turnup portions 6b that are continuous with the both ends of the main portion 6a and are turned up around the bead cores 5 from the axially inside to the axially outside of the tire to thereby anchor the carcass ply. Steel cords are preferred as a carcass cord, but organic fiber cords can also be used, as occasion demands, e.g., aromatic polyamide, nylon, rayon and polyester cords.

Between the main portion 6a and each turnup portion 6b is disposed a bead apex rubber 8 having an approximately triangular cross section that extends radially outwardly from the bead core 5 in a tapered manner and that serves to reinforce the bead portions.

The bead apex rubber 8 shown in this embodiment has a two layer structure composed of a radially inner apex portion 8A made of a hard rubber having a hardness of 80 to 90 and a radially outer apex portion 8B made of a soft rubber having a hardness of 40 to 60 and disposed radially outward or axially outward of the inner apex portion 8A. The height H1 of the bead apex rubber 8 from a bead base line BL to the tip 8e is from 35 to 50% of the section height HO of the tire. Since the height of the bead apex rubber 8 is relatively large, it serves to enhance the rigidity of the sidewall portion to improve the steering stability, while suppressing occurrence of damages at its tip 8e.

Figure 3:
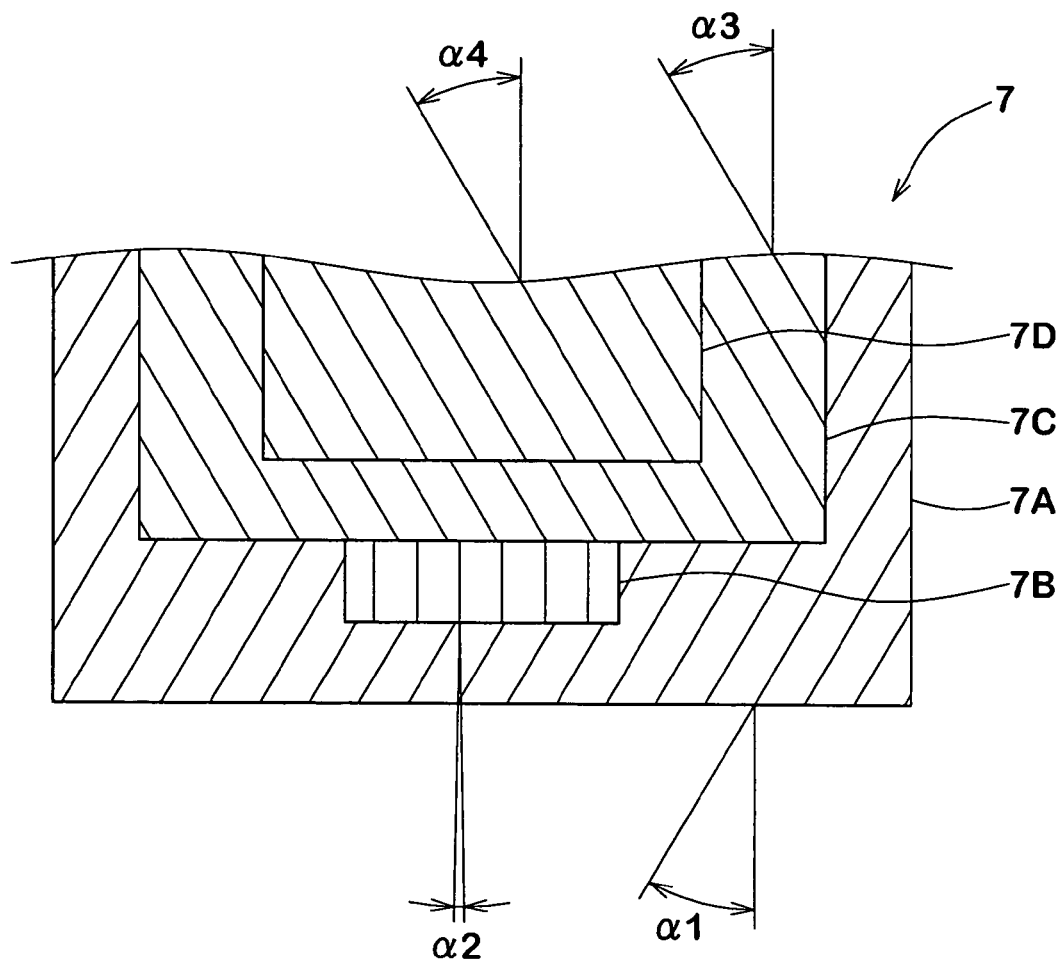
FIG. 3 is a view illustrating a cord arrangement of belt plies.

The belt layer 7 comprises at least three plies, usually three or four plies, of belt cords made of steel. The tire 1 according to the embodiment shown in FIG. 1 includes a belt layer 7 composed of four belt plies wherein first to fourth belt plies 7A to 7D are stacked one after another in that order from radially inward toward radially outward of the tire As shown in FIG. 3, the first belt ply 7A is disposed on the radially innermost side of the belt layer so that the belt cords are oriented at an angle $\alpha 1$ of 10 to 45° with respect to the tire circumferential direction. The second belt ply 7B is disposed on the first belt ply 7A such that the belt cords are spirally wound in substantially the circumferential direction, namely at an angle $\alpha 2$ of at most 5° with respect to the circumferential direction. The third belt ply 7C is disposed radially outward of the second belt ply 7B so that the belt cords are oriented at an angle $\alpha 3$ of 10 to 45° with respect to the circumferential direction provided that the slanting direction of the cords is reverse to that of the first belt ply 7A. The fourth belt ply 7D may be optionally used and, therefore, the fourth belt ply 7D used in this embodiment is not particularly limited. The tire 1 shown in FIG. 1 includes a fourth belt ply of steel cords which are oriented at an angle $\alpha 4$ of 10 to 45° with respect to the circumferential direction with an inclination in the same direction as the cords of the third belt ply 7C.

The axial width W1 of the first belt ply 7A and the axial width W3 of the third belt ply 7C are 85% or more of the tread ground contact width Tw, respectively. The axial width W2 of the second belt ply 7B is 70% or more of the tread ground contact width Tw, and is smaller than the widths W1 and W3 of the first and third belt plies. The axial width W1 and the axial width W3 are selected so that the difference W1-W3 is at least 14 mm, in other words, the axially outer ends of the first and third belt plies 7A and 7D are spaced from each other by an axial distance L of at least 7 mm, whereby stress concentration to the outer ends of the first and third belt plies is eased. The axial width W4 of the fourth belt ply 7D is at least smaller than the width W3 of the third belt ply 7C. In the embodiment shown in FIG. 1, the fourth belt ply 7D has an axial width larger than the width W2 to enhance the reinforcing effect. The upper limits of the ply widths W1 and W3 are 100% of the tread ground contact width Tw.

In the belt layer 7 so constructed, the belt cords of either one of the first to third belt plies 7A to 7C crosses the belt cords of another belt ply to form triangle structure, whereby a necessary belt rigidity can be ensured. Further, since the second belt ply 7B is disposed so that the belt cords are oriented in substantially the circumferential direction, the binding force for the tread portion 2 can be significantly increased. Thus, the belt layer 7 exhibits an excellent hoop effect over a wide range to suppress the outer diameter growth of the tread portion, whereby occurrence of uneven wear, belt edge separation and cracking at the bottom of tread grooves can be effectively prevented.

If the widths W1 and W3 of the first and third belt plies 7A and 7C are less than 85% of the tread ground contact width Tw, or if the width W2 of the second belt ply 7B is less than 70% of the tread ground contact width Tw, the hoop effect is not sufficiently exhibited at a tread shoulder portion and accordingly the effects of suppressing occurrence of uneven wear, belt edge separation and crack generation in tread groove bottom are not sufficiently achieved.

Figure 2:
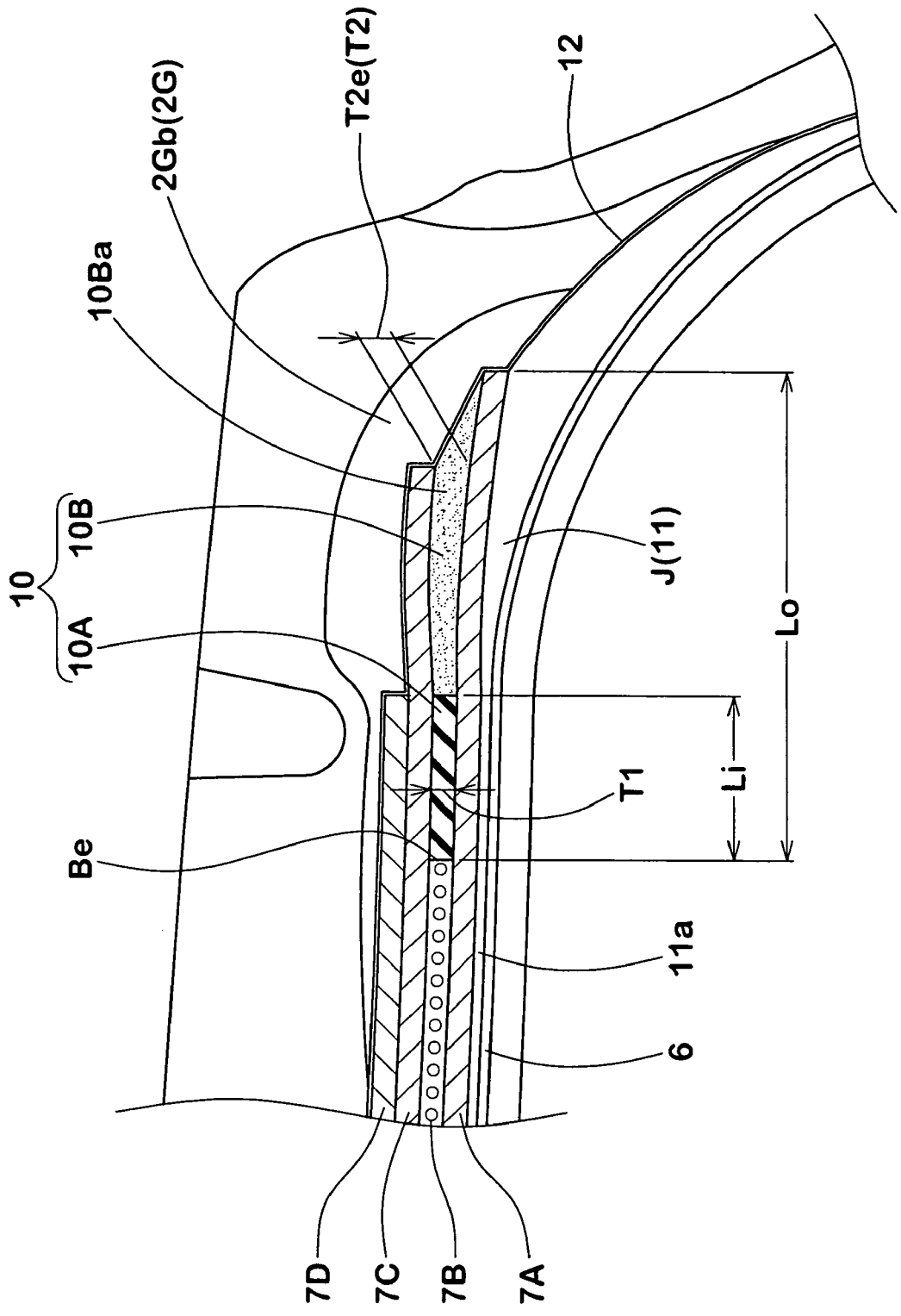
FIG. 2 is a cross sectional view showing a part of a tread portion of the tire shown in FIG. 1 in an enlarged form.

On the other hand, application of the belt layer having a structure as mentioned above tends to easily cause separation damages such as interlaminar separation between the first and third belt plies at the both edge portions of the belt layer. Thus, in the present invention, reinforcing rubber layers 10 which extend axially outwardly from each of the axially outer ends Be of the second belt ply 7B are disposed on the both sides of the second belt ply 7B and between the first and third belt plies 7A and 7C, as shown in FIG. 2.

Each of the reinforcing rubber layers 10 comprises an axially inner rubber portion 10A which is continuous with the axially outer end Be of the second belt ply 7B and extends in the axial direction with keeping a substantially constant thickness T1 and which has a complex elastic modulus E*1 of 8.0 to 14.0 MPa, and an axially outer rubber portion 10B which is continuous with the axially inner rubber portion 10A and which has a complex elastic modulus E*2 of 6.0 to 12.0 MPa which is smaller than the complex elastic modulus E*1.

Such a reinforcing rubber layer 10 serves to reinforce a portion located axially outward of the second belt ply 7B so as to ensure an excellent rigidity in a range up to the edges of the belt layer 7, whereby the uneven wear resistance and the cracking resistance are further enhanced. Further, since a rubber having a high elasticity is used in the inner rubber portion 10A of the reinforcing rubber layer 10, movement between the first and third belt plies 7A and 7C can be suppressed to prevent the interlaminar separation. Further, since the outer rubber portion 10B has a lower elasticity than the inner rubber portion 10A, a shear force which concentrates on the edges of the first and third belt plies 7A and 7C can be eased to suppress cord loosening at these belt edges (belt edge separation).

It is required that the inner rubber portion 10A of the reinforcing rubber layer 10 has a substantially constant thickness T1 within the range of 1.5 to 4.0 mm and the outer rubber portion 10B has a thickness T2e of at least 2.0 mm at the axially outer end of the third belt ply 7C. If the thickness T1 is less than 1.5 mm, the interlaminar separation tends to occur, and if it is more than 4.0 mm, the reinforcing effect is decreased and cracking tends to occur. Also, if the thickness T2e is less than 2.0 mm, cord loosening tends to occur at the edges of the first and third belt plies 7A and 7C. From such points of view, the thickness T1 is preferably at least 1.75 mm, and the thickness T2e is preferably at least 2.75 mm, more preferably at least 3.0 mm, most preferably at least 3.25 mm. The upper limit of the thickness T2e is not particularly limited, but a thickness of 4.5 mm or less is preferred.

If the complex elastic modulus E*1 of the inner rubber portion 10A is more than 14.0 MPa, the interlaminar separation tends to occur, and if it is less than 8.0 MPa, the reinforcing effect is decreased and cracking tends to occur. Also, if the complex elastic modulus E*2 of the outer rubber portion 10B is more than 12.0 MPa, cord loosening tends to occur at the edges of the first and third belt plies 7A and 7C, and if it is less than 6.0 MPa, the reinforcing effect is decreased and cracking tends to occur.

It is preferable that the difference E*1−E*2 between the complex elastic moduluses E*1 and E*2 is from 1.0 to 4.0 MPa.

For the same reasons as above, it is preferable that the inner rubber portion 10A has a hardness Hs1 of 69 to 79, and the outer rubber portion 10B has a hardness Hs2 which is selected from a range of 65 to 75 so as to be lower than the hardness Hs1.

From the viewpoint of balance between interlaminar separation control and cord loosening control, it is preferable that the axial width Li of the inner rubber portion 10A is from 20 to 50% of the axial full width Lo of the reinforcing rubber layer 10. From the viewpoint of cord loosening control, it is also preferable that the thickness T2e at the edges of the outer rubber portion 10B is not less than the thickness T1, especially more than the thickness T1. For this purpose, as in the embodiment shown in FIG. 2, it is preferable that the outer rubber portion 10B of the reinforcing rubber layer 10 includes a thickness-gradually increasing part 10Ba which extends axially outwardly from the axially outer end of the inner rubber portion 10A and in which the thickness T2 of the outer rubber portion 10B is gradually increased toward the belt edge. It is particularly preferred to form the thickness-gradually increasing part 10Ba to extend up to the edge of the third belt ply 7C.

The axially outer end portions of the first belt ply 7A separate from the carcass 6, and the distance between them gradually increases toward axially outward of the tire. In each of these spaces J is disposed a cushion rubber 11 having an approximately triangular cross section in order to further suppress occurrence of damages at the edges of the belt ply 7A. The cushion rubber 11 has a complex elastic modulus E*3 of 2.0 to 5.0 MPa and satisfies the relationship of E*3<E*2≦E*1. In the present invention, a shear force between the first belt ply 7A and the carcass 6 tends to increase since the cord angle α1 of the first belt ply 7A is small as compared with conventional belt cord angle. Therefore, in this embodiment, a thin auxiliary layer portion 11a having a thickness of 0.5 to 2.0 mm is additionally provided to the cushion rubber 11 so as to extend up to the tire equator passing between the first belt ply 7A and the carcass ply 6A, thereby easing the shear force.

The cushion rubber 11 disposed radially inward of each edge portion of the belt layer 7 extends therefrom along the carcass ply 6A in a tapered manner so as to terminate at a location radially above the tip 8e of the bead apex rubber 8.

A tread rubber 2G is disposed radially outward of the belt layer 7. As shown in FIG. 2, a tread rubber 2G may be disposed in the tread portion 2 through an adhesive rubber layer 12 which is thinner than the auxiliary layer portion 11A, for example, which has a thickness of 0.5 mm or less. The adhesive rubber layer 12 is disposed to cover the radially outer surface of the fourth belt ply 7D, the radially outer surface of the third belt ply 7C, the edge surface of the reinforcing rubber layer 10 and the radially outer surface of the cushion rubber 11. The edge surface of the reinforcing rubber layer 10 is adjacent to a base rubber portion 2Gb of the tread rubber 2G through the adhesive rubber layer 12. A known base rubber 2Gb is applicable and, for example, it has a hardness of about 64 and a complex elastic modulus of about 5 MPa. The inner and outer rubber portions 10A and 10B of the reinforcing rubber layer 10 have a higher hardness and a higher elasticity than the base rubber portion 2Gb.

Referring now to FIGS. 4 to 7, there is illustrated another embodiment of the present invention wherein a heavy duty radial tire 1 includes, instead of a belt layer 7 having the above-mentioned structure, a belt layer 7 comprising at least four essential belt plies, i.e., first to fourth belt plies 7A to 7D having specific cord arrangement.

Figure 6:
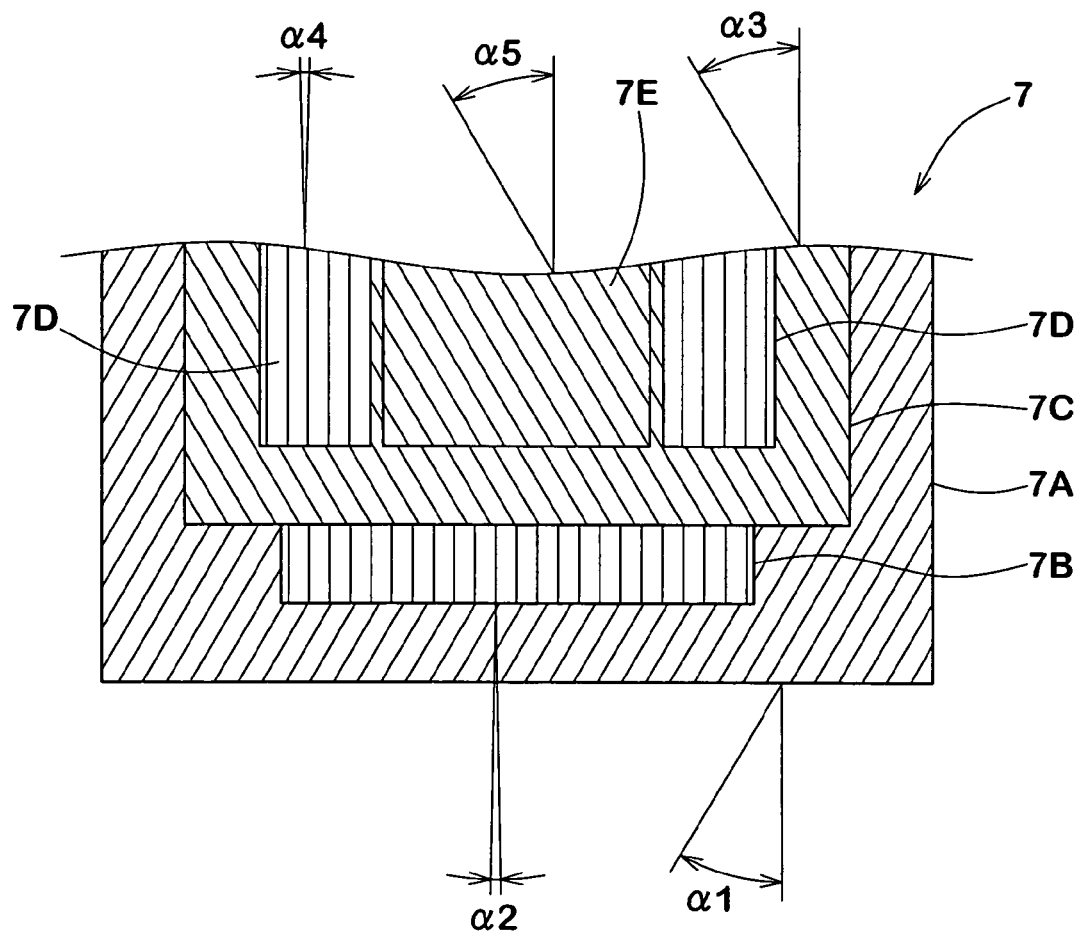
FIG. 6 is a view illustrating a cord arrangement of belt plies in the tire shown in FIG. 4.

As shown in FIG. 6, the first belt ply 7A is disposed on the radially innermost side of a belt layer 7 so that the belt cords are oriented at an angle α1 of 10 to 45° with respect to the tire circumferential direction. The second belt ply 7B is disposed on the first belt ply 7A such that the belt cords are spirally wound in substantially the circumferential direction, namely at an angle α2 of at most 5° with respect to the circumferential direction. The third belt ply 7C is disposed radially outward of the second belt ply 7B so that the belt cords are oriented at an angle α3 of 10 to 45° with respect to the circumferential direction provided that the slanting direction of the cords is reverse to that of the first belt ply 7A.

In the embodiment as shown in FIGS. 4 to 7, the fourth belt ply 7D is composed of a pair of belt plies which may be disposed in contact with each other or may be disposed with leaving a space between them. As stated with respect to the first embodiment mentioned above, the fourth belt ply 7D disposed on the third belt ply 7C may be a single ply. The cords of a single belt ply 7D or a pair of the belt plies 7D are spirally wound in substantially the circumferential direction, namely at an angle α4 of at most 5° with respect to the circumferential direction.

Figure 4:
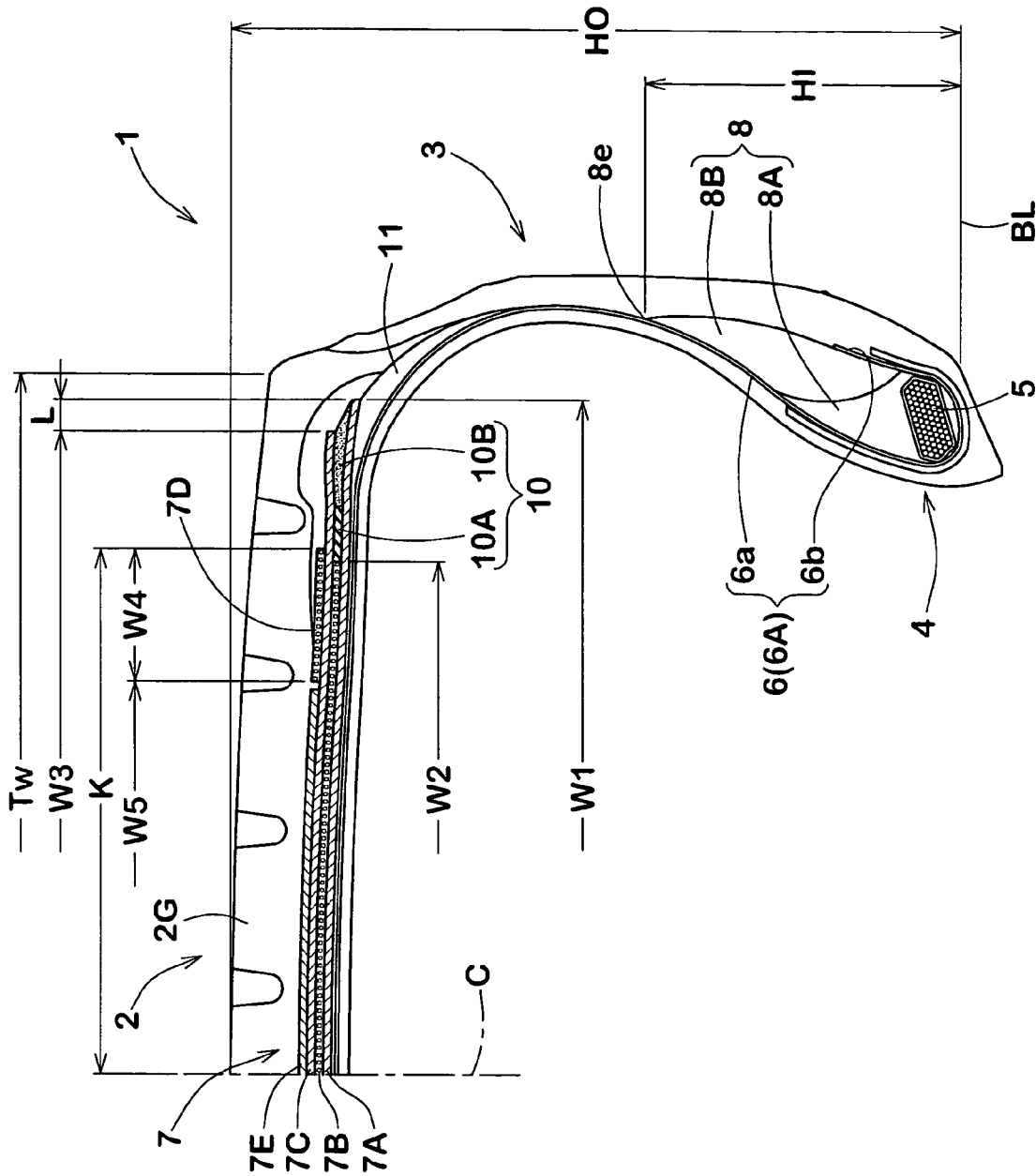
FIG. 4 is a cross sectional view of a heavy duty radial tire showing another embodiment of the present invention.
Figure 5:
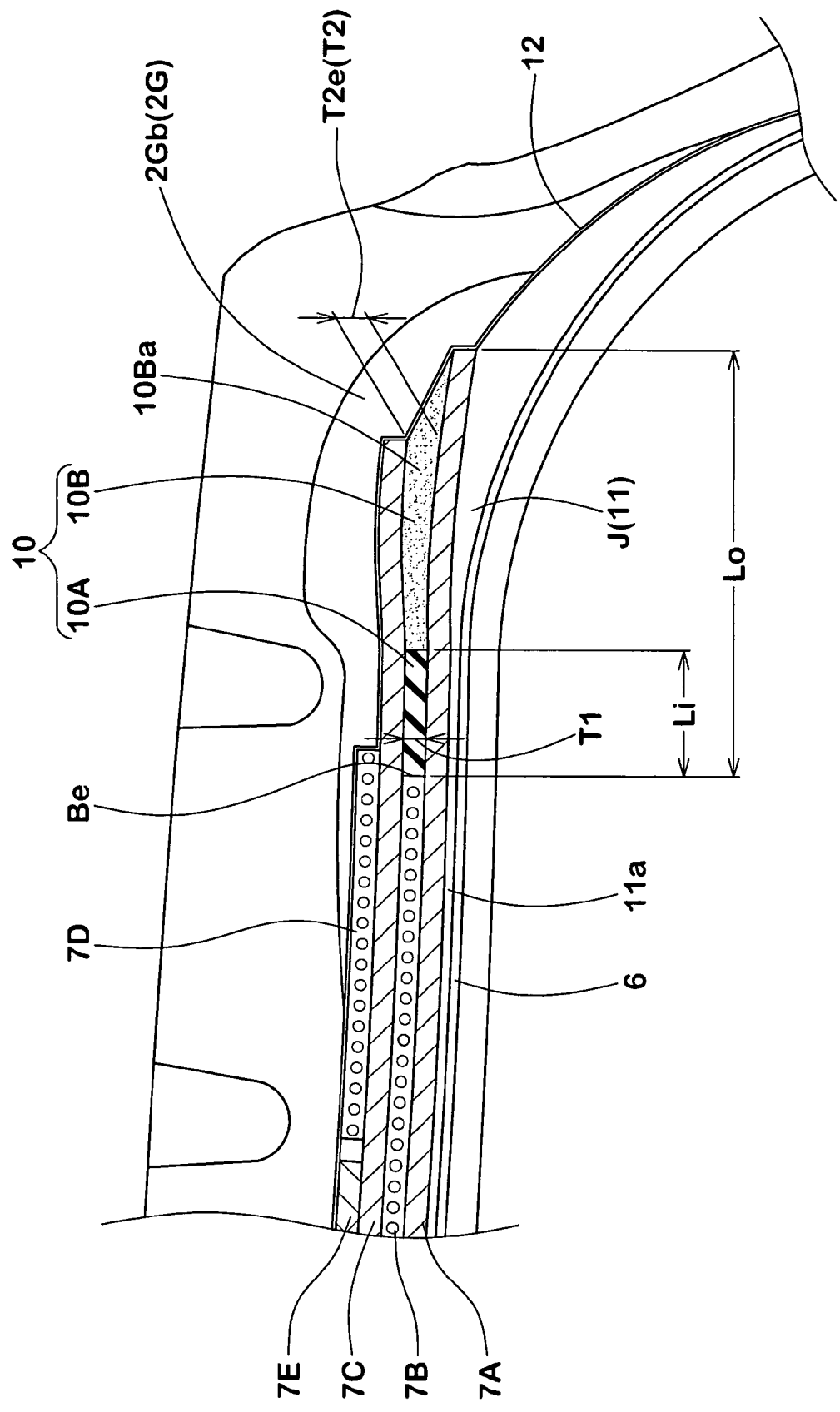
FIG. 5 is a cross sectional view showing a part of a tread portion of the tire shown in FIG. 4 in an enlarged form.

As shown in FIGS. 4 to 6, a fifth belt ply 7E may be further disposed radially outward of the third belt ply 7C and between a pair of the belt plies 7D, as occasion demands. The fifth belt ply 7E used in this embodiment is not particularly limited. The tire 1 shown in FIGS. 4 to 6 includes a fifth belt ply 7E of steel cords which are oriented at an angle α5 of 10 to 45° with respect to the circumferential direction in the same inclination direction as the cords of the third belt ply 7C.

The belt layer according to this embodiment has the advantage that the outer diameter growth can be further suppressed.

The axial width W1 of the first belt ply 7A and the axial width W3 of the third belt ply 7C are 85% or more of the tread ground contact width Tw, respectively. The axial width W2 of the second belt ply 7B is 70% or more of the tread ground contact width Tw, and is smaller than the widths W1 and W3 of the first and third belt plies. Preferably, the axial width W1 and the axial width W3 are selected so that the difference W1-W3 is at least 14 mm, in other words, the axially outer ends of the first and third belt plies 7A and 7D are spaced from each other by an axial distance L of at least 7 mm, whereby stress concentration to the outer ends of the first and third belt plies is eased. The upper limits of the ply widths W1 and W3 are 100% of the tread ground contact width Tw. The axial width W4 of each of the fourth belt plies 7D is at least 5 mm, and the distance K from the tire equator to the axially outer end of each of the fourth belt plies 7D is from 35 to 40% of the tread ground contact width Tw.

Figure 7:
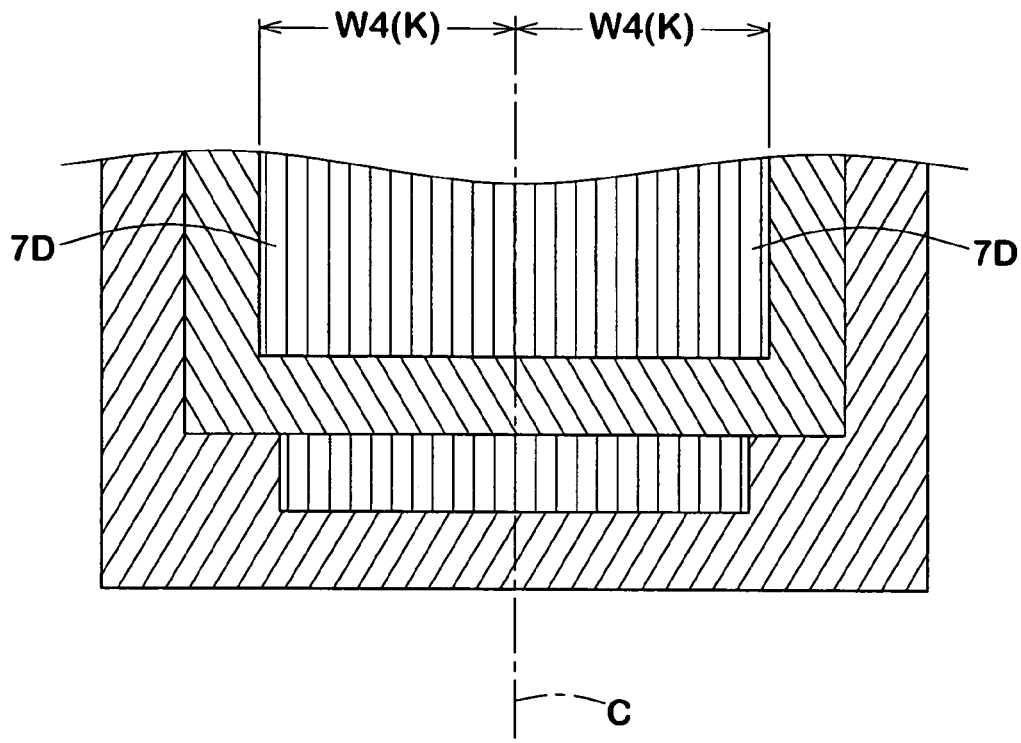
FIG. 7 is a view illustrating a cord arrangement of belt plies of a belt layer according to another embodiment.

As shown in FIG. 7, the axial width W4 of each of the fourth belt plies 7D may be identical with the distance K. In that case, a pair of the belt plies 7D are disposed so that the axially inner edges of the both belt plies 7D, 7D are brought into contact with each other at the tire equator C. As stated above, instead of a pair of the fourth belt plies 7D, 7D may be used a single belt ply 7D in which the belt cords are oriented, for instance, at an angle α4 of at most 5° with respect to the circumferential direction.

In case of disposing a pair of the fourth belt plies 7D with leaving a space between them as shown in FIGS. 4 to 6, it is preferable to dispose the fifth belt ply 7E between them. In that case, the axial width W4 of each of the belt plies 7D is selected from 5 to 135 mm. For example, the axial width W4 of each or the belt plies 7D may be from about 1.3 to about 20%, especially about 1.5 to about 15%, of the tread ground contact width Tw.

In the belt layer 7 so constructed, the belt cords of either one of the first to third belt plies 7A to 7C cross the belt cords of another belt ply to form a strong triangle structure, whereby a necessary belt rigidity can be ensured. Further, since the second belt ply 7B is disposed so that the belt cords are oriented in substantially the circumferential direction, the binding force for the tread portion 2 can be significantly increased. Moreover, the fourth belt plies 7D serves to intensively enhance the binding force at a shoulder region which is usually in a lacking tendency. Thus, the fourth belt plies 7D exhibits, in cooperation with the second belt ply 7B, an excellent hoop effect uniformly over a wide range to suppress the outer diameter growth of the tread portion, whereby occurrence of uneven wear, belt edge separation and cracking at the bottom of tread grooves can be effectively prevented.

If the widths W1 and W3 of the first and third belt plies 7A and 7C are less than 85% of the tread ground contact width Tw, or if the width W2 of the second belt ply 7B is less than 70% of the tread ground contact width Tw, the hoop effect is not sufficiently exhibited at a tread shoulder portion and accordingly the effects of suppressing occurrence of uneven wear, belt edge separation and crack generation in tread groove bottom are not sufficiently achieved. If the width W4 of the fourth belt ply 7D is less than 5 mm, and if the distance K from the tire equator to the axially outer edge of the fourth belt ply 7D is less than 35% of the tread ground contact width Tw, the hoop effect in the shoulder region is not sufficiently exhibited and accordingly the effects of suppressing occurrence of uneven wear, belt edge separation and crack generation in tread groove bottom are not sufficiently achieved. If the distance K for the axially outer edge of the fourth belt ply 7D is more than 40% of the tread ground contact width Tw, a tension at the axially outer edge of the fourth belt ply 7D increases, so the belt cords tend to break.

In order to prevent occurrence of separation damages such as interlaminar separation between the first and third belt plies 7A and 7C at the both edge portions of the belt layer, reinforcing rubber layers 10 which extend axially outwardly from each of the axially outer edges Be of the second belt ply 7B are disposed on the both sides of the second belt ply 7B and between the first and third belt plies 7A and 7C, in the same manner as the first embodiment as shown in FIGS. 1 to 3.

All other components, including bead apex rubber 8 and cushion rubber 11, of the tire 1 explained with respect to the embodiments as shown in FIGS. 1 to 3 are also applicable to the embodiments as shown in FIGS. 4 to 7.

While preferable embodiments of the present invention have been described with reference to the drawings, it goes without saying that the present invention is not limited to only such embodiments and various changes and modifications may be made. The present invention is more specifically described and explained by means of the following examples and comparative examples. It is to be understood that the present invention is not limited to these examples.

EXAMPLES 1 TO 4 AND COMPARATIVE EXAMPLES 1 TO 6

Low aspect ratio heavy duty radial tires (size: 435/45R22.5) having a base structure shown in FIG. 1 were manufactured based on the specifications shown in Table 1, and the uneven wear resistance, cracking resistance at groove bottom and tread durability of the tires were tested by the methods described below. In the tires manufactured in these Examples and Comparative Examples, the belt cord angle $\alpha 1$ of the first ply 7A was +18° with respect to the circumferential direction, the belt cord angle $\alpha 2$ of the second ply 7B was approximately 0° (spiral winding), the belt cord angle $\alpha 3$ of the third ply 7C was −18°, and the belt cord angle $\alpha 4$ of the fourth ply 7D was −18°.

Figure 8:
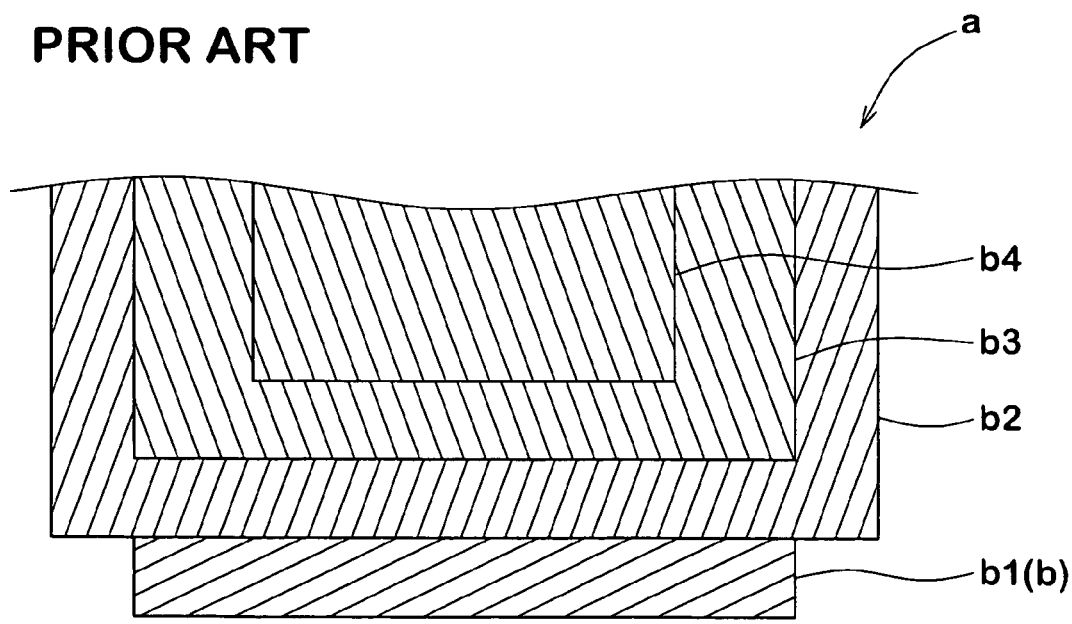
FIG. 8 is a view illustrating a cord arrangement of belt plies in a conventional tire.

As a Control was also manufactured a tire according to a conventional belt cord arrangement shown in FIG. 8 in which the belt cord angle $\alpha c1$ of the first ply b1 was +50° with respect to the circumferential direction, the belt cord angle $\alpha 2$ of the second ply b2 was +18°, the belt cord angle $\alpha 3$ of the third ply b3 was −18°, and the belt cord angle $\alpha 4$ of the fourth ply b4 was −18°.

<Uneven Wear Resistance>

Each of tires was mounted on a rim (size: 22.5×14.00), inflated to an internal pressure of 900 kPa, attached to all wheels of a 2-D·4 test car and run 10,000 km in total on actual road including expressway, town road and mountain road. The depth of a shoulder groove after the running was measured. The results are shown as an index based on the result of Control regarded as 100. The larger the value, the better the uneven wear resistance.

<Cracking Resistance>

After the running test for the measurement of uneven wear resistance, the presence of cracks in the bottom of the shoulder groove was visually observed. In the tables, the mark ○ denotes absence of cracks, and the mark x denotes presence of cracks.

<Durability>

After the running test for the measurement of uneven wear resistance, the tires were dismantled, and the presence of interlaminar separation between the first and third belt plies and cord loosening at the first and third belt ply edges were visually observed. In the tables, the mark ○ denotes absence of interlaminar separation or cord loosening, and the mark x denotes presence of interlaminar separation or cord loosening.

Test results are shown in Table 1.

TABLE 1

|  | Control | Ex. 1 | Ex. 2 | Ex. 3 | Ex. 4 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Belt layer structure | FIG. 8 | FIG. 3 | FIG. 3 | FIG. 3 | FIG. 3 | FIG. 3 | FIG. 3 | FIG. 3 | FIG. 3 | FIG. 3 | FIG. 3 |
| Ply width W1 (W1/Tw) | 0.91 | 0.96 | 0.96 | 0.96 | 0.96 | 0.96 | 0.96 | 0.96 | 0.96 | 0.96 | 0.96 |
| Ply width W2 (W2/Tw) | 0.96 | 0.72 | 0.72 | 0.72 | 0.70 | 0.72 | 0.72 | 0.64 | 0.72 | 0.72 | 0.68 |
| Ply width W3 (W3/Tw) | 0.92 | 0.91 | 0.92 | 0.91 | 0.91 | 0.93 | 0.91 | 0.91 | 0.91 | 0.91 | 0.91 |
| Ply width W4 (W4/Tw) | 0.42 | 0.81 | 0.81 | 0.81 | 0.81 | 0.81 | 0.81 | 0.81 | 0.81 | 0.81 | 0.81 |
| Distance L (mm) | — | 10 | 7 | 10 | 10 | 5 | 10 | 10 | 10 | 10 | 10 |
| Reinforcing rubber layer |  |  |  |  |  |  |  |  |  |  |  |
| Inner rubber portion | no | yes | yes | yes | yes | yes | yes | yes | yes | yes | yes |
| Complex elastic modulus E*1 (MPa) | — | 9.3 | 10.3 | 10.3 | 10.3 | 10.3 | 10.3 | 10.3 | 10.3 | 10.3 | 10.3 |
| Thickness T1 (mm) | — | 1.7 | 1.7 | 2.0 | 1.7 | 1.7 | 1.0 | 1.7 | 4.5 | 1.3 | 1.7 |
| Outer rubber portion | no | yes | yes | yes | yes | yes | yes | yes | yes | yes | yes |

TABLE 1-continued

|  | Control | Ex. 1 | Ex. 2 | Ex. 3 | Ex. 4 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Complex elastic modulus E*2 (MPa) | — | 9.3 | 9.3 | 9.3 | 9.3 | 9.3 | 9.3 | 9.3 | 9.3 | 9.3 | 9.3 |
| Thickness T2e (mm) | — | 2.0 | 2.0 | 2.0 | 2.0 | 2.0 | 2.0 | 2.0 | 2.0 | 2.0 | 2.0 |
| Presence of thickness-increasing part | — | yes | yes | no | yes | yes | yes | yes | no | yes | yes |
| Uneven wear resistance | 100 | 150 | 150 | 150 | 150 | 150 | 150 | 100 | 100 | 150 | 150 |
| Cracking resistance | x | ○ | ○ | ○ | ○ | ○ | ○ | x | x | ○ | x |
| Tread durability |  |  |  |  |  |  |  |  |  |  |  |
| Interlaminar separation | — | ○ | ○ | ○ | ○ | ○ | x | ○ | ○ | x | ○ |
| Cord loosening | — | ○ | ○ | ○ | ○ | x (10 mm) | ○ | ○ | ○ | ○ | ○ |

EXAMPLES 5 TO 8 AND COMPARATIVE EXAMPLES 7 TO 9

Low aspect ratio heavy duty radial tires (size: 435/45R22.5) having a base structure shown in FIG. 4 were manufactured based on the specifications shown in Table 2, and the tires were tested with respect to uneven wear resistance, cracking resistance at groove bottom, tread durability and outer diameter growth resistance. In the tires manufactured in these Examples and Comparative Examples, the belt cord angle α1 angle of first ply 7A was +18° with respect to the circumferential direction, the belt cord angle α2 of second ply 7B was approximately 0° (spiral winding), the belt cord angle α3 of third ply 7C was −18°, the belt cord angle α4 of fourth ply 7D was approximately 0° (spiral winding), and the belt cord angle α5 of fifth ply 7E was −18°.

In Examples 5, 6 and 8 and Comparative Examples 7 to 9, a pair of fourth belt plies 7D were disposed on the both axially outer sides of the fifth belt ply 7E. In Example 7, a single fourth belt ply 7D was disposed instead of a pair of the belt plies 7D.

The uneven wear resistance and the cracking resistance were measured in the same manner as above. The durability and the outer diameter growth resistance were measured by the following methods.

<Durability>

After the 10,000 km running test for the measurement of uneven wear resistance, the tires were dismantled, and the presence of interlaminar separation between the first and third belt plies and cord breaking at the second and fourth belt ply edges were visually observed. In Table 2, the mark ○ denotes absence of interlaminar separation or cord breaking, and the mark x denotes presence of interlaminar separation or cord breaking. If interlaminar separation was observed, the length of separation was measured and is shown in the table.

<Outer Diameter Growth Resistance>

A tire was run for 25 hours using a drum tester under conditions of rim 22.5×14.00, inner pressure 900 kPa, tire load 41.68 kN and speed 40 km/h. Increase in outer diameter of the tire was measured on the tread surface, and the maximum value was adopted.

Test results are shown in Table 2.

From the results shown in Tables 1 and 2, it is understood that according to the present invention, uneven wear and cracking in tread groove bottom can be suppressed without deteriorating the tread durability.

TABLE 2

|  | Control | Ex. 5 | Com. Ex. 7 | Com. Ex. 8 | Com. Ex. 9 | Ex. 6 | Ex. 7 | Ex. 8 |
|---|---|---|---|---|---|---|---|---|
| Belt layer structure | FIG. 8 | FIG. 6 | FIG. 6 | FIG. 6 | FIG. 6 | FIG. 6 | FIG. 3* | FIG. 6 |
| Ply width W1 (W1/Tw) | 0.91 | 0.96 | 0.96 | 0.96 | 0.96 | 0.96 | 0.96 | 0.96 |
| Ply width W2 (W2/Tw) | 0.96 | 0.72 | 0.72 | 0.72 | 0.72 | 0.72 | 0.72 | 0.72 |
| Ply width W3 (W3/Tw) | 0.92 | 0.91 | 0.91 | 0.91 | 0.91 | 0.93 | 0.91 | 0.91 |
| Ply width W4 (mm) | — | 40 | 67 | 19 | 4 | 40 | 135 | 40 |
| Ply width W5 (W5/Tw) | 0.45 | 0.52 | 0.52 | 0.45 | 0.52 | 0.52 | — | 0.52 |
| Distance K (K/Tw) | — | 0.37 | 0.44 | 0.30 | 0.37 | 0.37 | 0.37 | 0.37 |
| Distance L (mm) | — | 10 | 10 | 10 | 10 | 5 | 10 | 10 |
| Reinforcing rubber layer |  |  |  |  |  |  |  |  |
| Inner rubber portion | no | yes | yes | yes | yes | yes | yes | yes |
| Complex elastic modulus E*1 (MPa) | — | 10.3 | 10.3 | 10.3 | 10.3 | 10.3 | 10.3 | 10.3 |
| Thickness T1 (mm) | — | 2.0 | 2.0 | 2.0 | 2.0 | 2.0 | 2.0 | 2.0 |
| Outer rubber portion | no | yes | yes | yes | yes | yes | yes | yes |
| Complex elastic modulus E*2 (MPa) | — | 9.3 | 9.3 | 9.3 | 9.3 | 9.3 | 9.3 | 9.3 |
| Thickness T2e (mm) | — | 3.5 | 3.5 | 3.5 | 3.5 | 3.5 | 3.5 | 2.5 |
| Presence of thickness-increasing part | — | yes | yes | yes | yes | yes | yes | yes |
| Uneven wear resistance | 100 | 180 | 180 | 160 | 170 | 180 | 180 | 180 |
| Cracking resistance | x | ○ | ○ | ○ | ○ | ○ | ○ | ○ |

TABLE 2-continued

|  | Control | Ex. 5 | Com. Ex. 7 | Com. Ex. 8 | Com. Ex. 9 | Ex. 6 | Ex. 7 | Ex. 8 |
| --- | --- | --- | --- | --- | --- | --- | --- | --- |
| Tread durability |  |  |  |  |  |  |  |  |
| Interlaminar separation | ○ | ○ | ○ | ○ | ○ | 10 mm | ○ | 10 mm |
| Cord breaking at 2nd belt ply edge | ○ | ○ | ○ | ○ | ○ | ○ | ○ | ○ |
| Cord breaking at 4th belt ply edge | — | ○ | x | ○ | ○ | ○ | ○ | ○ |
| Outer diameter growth resistance | 4 | 1.8 | 1.8 | 2.2 | 2 | 1.8 | 1.8 | 1.8 |

*Tire of Ex. 7 has a belt layer structure shown in FIG. 3, but the cord angle α4 of 4th belt ply is about 0°.

What is claimed is:

1. A heavy duty radial tire comprising a carcass which extends from a tread portion to each of bead cores in a pair of bead portions through a pair of sidewall portions, and a belt layer disposed radially outward of the carcass in the tread portion, wherein:

said belt layer comprises at least three plies of belt cords in which disposed on the radially innermost side is a first belt ply of belt cords arranged at an angle of 10 to 45° with respect to the tire circumferential direction, a third belt ply is disposed radially outward of said first belt ply, the belt cords of said third belt ply being arranged at an angle of 10 to 45° with respect to the tire circumferential direction in the slanting direction reverse to that of said first belt ply, and between said first and third belt plies is disposed a second belt ply of belt cords spirally wound at an angle of at most 5° with respect to the tire circumferential direction, and in which the axial width W1 of said first belt ply and the axial width W3 of said third belt ply are at least 85% of a tread ground contact width Tw and the difference W1-W3 is at least 14 mm, and the axial width W2 of said second belt ply is at least 70% of the tread ground contact width Tw and is smaller than the widths W1 and W3 of said first and third belt plies, a pair of reinforcing rubber layers are disposed between said first and third belt plies so as to extend axially outwardly from each of the axially outer ends of said second belt ply, and each of said reinforcing rubber layers comprises an axially inner rubber portion which is continuous with the axially outer end of said second belt ply and which has a substantially constant thickness T1 of 1.5 to 4.0 mm and a complex elastic modulus E*1 of 8.0 to 14.0 MPa, and an axially outer rubber portion which is continuous with said axially inner rubber portion and which has a thickness T2e of at least 2.0 mm at the axially outer end of said third belt ply and a complex elastic modulus E*2 of 6.0 to 12.0 MPa which is smaller than the complex elastic modulus E*1.

2. The heavy duty radial tire of claim 1, wherein said axially inner rubber portion of each of said reinforcing rubber layers has a shore A hardness Hs1 of 69 to 79, and said axially outer rubber portion has a shore A hardness Hs2 of 65 to 75 which is smaller than the hardness Hs1.

3. The heavy duty redial tire of claim 1, wherein the thickness T2e of said axially outer rubber portion is not less than the thickness T1 of said axially inner rubber portion.

4. The heavy duty radial tire of claim 1, wherein said axially outer rubber portion of each of said reinforcing rubber layers includes a thickness-gradually increasing part which extends axially outwardly from the axially outer end of said axially inner rubber portion with gradually increasing its thickness T2.

5. The heavy duty radial tire of claim 1, wherein said belt layer includes a fourth belt ply disposed radially outward of said third belt ply and having belt cords oriented at an angle of 10 to 45° with respect to the circumferential direction in the same inclination direction as the cords of said third belt ply.

6. The heavy duty radial tire of claim 1, wherein said belt layer includes a fourth belt ply disposed radially outward of said third belt ply and having belt cords oriented at an angle of at most 5° with respect to the circumferential direction.

7. A heavy duty radial tire comprising a carcass which extends from a tread portion to each of bead cores in a pair of bead portions through a pair of sidewall portions, and a belt layer disposed inside the tread portion and radially outward of the carcass and comprising a plurality of belt plies, wherein:

said belt layer comprises a first belt ply disposed on the radially innermost side and having belt cords arranged at an angle of 10 to 45° with respect to the tire circumferential direction, a third belt ply disposed radially outward of said first belt ply and having belt cords arranged at an angle of 10 to 45° with respect to the tire circumferential direction in the slanting direction reverse to that of said first belt ply, a second belt ply disposed between said first and third belt plies and having belt cords spirally wound at an angle of at most 5° with respect to the tire circumferential direction, and a fourth belt ply disposed radially outward of said third belt ply and having belt cords spirally wound at an angle of at most 5° with respect to the tire circumferential direction, in which the axial width W1 of said first belt ply and the axial width W3 of said third belt ply are at least 85% of a tread ground contact width Tw, the axial width W2 of said second belt ply is at least 70% of the tread ground contact width Tw and is smaller than the widths W1 and W3 of said first and third belt plies, the axial width W4 of said fourth belt ply is at least 5 mm, and the distance K from the tire equator to the axially outer end of said fourth belt ply is from 35 to 40% of the tread ground contact width Tw, a pair of reinforcing rubber layers are disposed between said first and third belt plies so as to extend axially outwardly from each of the axially outer ends of said second belt ply, and each of said reinforcing rubber layers comprises an axially inner rubber portion which is continuous with the axially outer end of said second belt ply and which has a substantially constant thickness T1 of 1.5 to 4.0 mm and a complex elastic modulus E*1 of 8.0 to 14.0 MPa, and an axially outer rubber portion which is continuous with said axially inner rubber portion and which has a thickness T2e of at least 2.0 mm at the axially outer end of said third belt ply and a complex elastic modulus E*2 of 6.0 to 12.0 MPa which is smaller than the complex elastic modulus E*1.

8. The heavy duty radial tire of claim 7, wherein the difference W1–W3 between the axial width W1 of said first belt ply and the axial width W3 of said third belt ply is at least 14 mm.

9. The heavy duty radial tire of claim 7, wherein said fourth belt ply is a pair of belt plies disposed on the both sides with respect to the tire equator with leaving a space between them.

10. The heavy duty radial tire of claim 9, wherein a fifth belt ply of belt cords oriented at an angle of 10 to 45° with respect to the circumferential direction in the same inclination direction as the cords of said third belt ply is disposed radially outward of said third belt ply and between said pair of fourth belt plies.

* * * * *